United States Patent [19]
Brown et al.

[11] Patent Number: 5,307,590
[45] Date of Patent: May 3, 1994

[54] VEE BOTTOM PLANT FLAT BED SYSTEM

[75] Inventors: Robert M. Brown, Hollister, Calif.; Mike Samilian, Temple Terrace, Fla.; James D. Brannon, San Luis Obispo, Calif.

[73] Assignee: Speedling, Incorporated, Sun City, Fla.

[21] Appl. No.: 851,876

[22] Filed: Mar. 16, 1992

[51] Int. Cl.$^5$ ............................................. A01G 31/00
[52] U.S. Cl. ............................................. 47/62; 47/17
[58] Field of Search .................... 47/62, 17 B, 17 MS, 47/17 R, 18 R, 59

[56] References Cited

U.S. PATENT DOCUMENTS

| | | |
|---|---|---|
| 2,198,150 | 4/1940 | Barnhart . |
| 2,940,218 | 6/1990 | Carter . |
| 3,842,535 | 10/1974 | Lahr . |
| 4,216,615 | 8/1980 | Söderberg et al. ............... 47/17 MS |
| 4,312,152 | 1/1982 | Drury et al. ............... 47/62 |
| 4,392,327 | 7/1983 | Sanders . |
| 4,584,791 | 4/1986 | Wolf ............... 47/62 |
| 4,793,096 | 12/1988 | Todd, Sr. ............... 47/62 |
| 4,837,971 | 6/1989 | Visser ............... 47/17 MS |
| 4,930,253 | 6/1990 | Todd, Sr. . |
| 4,934,096 | 6/1990 | Bentvelsen . |
| 5,009,029 | 4/1991 | Wittlin ............... 47/18 |

FOREIGN PATENT DOCUMENTS

| | | | |
|---|---|---|---|
| 02499269 | 12/1987 | European Pat. Off. ............... 47/17 |
| 806948 | 12/1936 | France ............... 52/14 |
| 1185857 | 8/1959 | France ............... 52/14 |
| 0574511 | 9/1977 | U.S.S.R. ............... 52/14 |

Primary Examiner—Ramon S. Britts
Assistant Examiner—Jeanne C. Downs
Attorney, Agent, or Firm—Mason, Fenwick & Lawrence

[57] ABSTRACT

A plant production bed is provided in which a slotted drain pipe extends longitudinally between a pair of slab components of a soaking bed. The slabs slope downward from their outer edges toward the slotted drain pipe, but are substantially level in a direction parallel to the slotted drain pipe. The slotted drain pipe is oriented horizontally. Because of the slope of the slab components, substantially less nutrient solution or water is required than in known flat bottomed systems. In a preferred embodiment, two complementary slabs are provided on opposite sides of a central swale and are tilted so as to provide a "vee" shape when viewed in cross-section, with the top of the swale being at the apex of the "vee". Several parallel soaking beds are arranged opposite sides of a central walkway under which a common flume pipe extends for providing nutrient solution or water to the beds or receiving same from the beds.

19 Claims, 4 Drawing Sheets

VEE BOTTOM PLANT FLAT BED SYSTEM

BACKGROUND OF THE INVENTION

1. Field of the Invention

The present invention relates to flotation plant production beds, in which plants growing in open bottom cells of floatable flat structures are periodically floated on a liquid nutrient solution or water for supplying same upwardly into the cells for moistening and/or supplying nutrients to the plant roots. More specifically, the present invention relates to plant production beds having structures and drainage systems which minimize the amount of nutrient solution which must be stored and used in order to feed a given quantity of plants.

2. Related Art

Flotation plant production beds are known in the art. For example, U.S. Pat. No. 4,930,253 (Todd, Sr.) discloses such a system. A floatable polystyrene foam or the like plant flat is provided with an array of hollow cavities or cells in which plant growth medium is situated. Apertures at the bottom of the cavities provide communication of water or nutrient solution to the growth medium when the plant flat is floated. When the nutrient solution is drained, root growth out the apertures is prevented by the exposure to air beneath the apertures (air pruning).

In addition to the Todd, Sr. patent, other plant production systems are known. For example, U.S. Pat. No. 2,198,150 (Barnhart), U.S. Pat. No. 2,940,218 (Carter), U.S. Pat. No. 3,842,535 (Lahr), U.S. Pat. No. 4,392,327 (Sanders) and U.S. Pat. No. 4,934,096 (Bentvelsen) provide various systems for producing plants, either in media or hydroponically. All documents referenced in this specification are incorporated herein by reference as if reproduced in full below.

Known plant production beds of the type disclosed in the Todd, Sr. patent have suffered the disadvantage that relatively large volumes of nutrient solution are required to fill the rectangular branch channels 78 of the patent sufficiently to float the plant flats. The floor slabs 80 have a planar upper surface which tilts downwardly longitudinally toward a drain at the inner end of each branch channel causing a large volume of water or nutrient solution to be required at the deeper end of the bed. Further, a relatively large amount of construction material is needed for the beds as shown in the patent. Also, the larger amount of water or nutrient solution requires a commensurately long time to fill and to drain the branch channels. Finally, larger storage containers are required for the large amount of water and nutrient solution. The present invention uses 50% of the amount of solution (and electrical power for pumping) required by the system of the Todd, Sr. patent for the same number of plant flats and also uses 30% less concrete for construction.

Therefore, there is a need in the art to provide a plant production system in which smaller volumes of nutrient solution are required.

It is therefore an object of the present invention to provide a plant production system requiring a minimal amount of construction material.

A further object is to provide a plant production system in which minimal time is required to fill and drain nutrient solution.

Yet another object of the present invention is the provision of a plant production system in which given pumping equipment is capable of servicing a larger number of plant production beds than was possible with prior art systems.

Another object is to provide a plant production system in which smaller storage tanks are required for a given number of plant production beds.

SUMMARY OF THE INVENTION

The present invention overcomes the disadvantages of known systems, and provides a floatation plant production system which fulfills the needs and objects enumerated above in a manner to be discussed.

The present invention in a first embodiment provides rectangular plant production bed having first and second parallel curbs or side walls between which a slotted drain pipe extends along the length of the axis of the bed equidistantly spaced from the two side walls of the bed with first and second floor slabs respectively extending from opposite side walls to the slot in the drain pipe which faces upwardly and separates the inner edges of the two floor slabs. The floor slabs slope downwardly from their outer edges adjacent a respective side wall toward the slot in the drain pipe, but are substantially horizontal in the axial direction parallel to the slotted drain pipe. The slotted drain pipe is also horizontal. Since the cross-sectional area of a transverse section through the liquid nutrient in the liquid nutrient in the bed is less than would be the case for a conventional rectangular bed, substantially less nutrient solution and/or water is required than in known systems.

In the first embodiment, two complementary floor or bottom slabs are provided on opposite sides of the slotted drain pipe in each branch channel, and are sloped downwardly from their outer edges toward the center of the bed so as to provide a "vee" shape when viewed in transverse cross-section, with the slot of the drain pipe being located at the apex of the "vee". In a particular preferred arrangement, several parallel branch channels or soaking beds are arranged so that the slotted drain pipes of each are substantially parallel. The lower end of the slotted drain pipes empty into a common flume through which the nutrient solution or water may be either supplied or drained.

A second embodiment employs a lengthwise extending drain trough or swale extending centrally lengthwise of the length of each branch channel in place of the slotted drain pipe employed in the first embodiment.

BRIEF DESCRIPTION OF THE DRAWINGS

The invention will be better understood by reading the following detailed description of the various embodiments with reference to the accompanying drawing figures, in which like reference numerals refer to like elements throughout, and in which.

DETAILED DESCRIPTION OF THE TWO EMBODIMENTS

Figure 1:
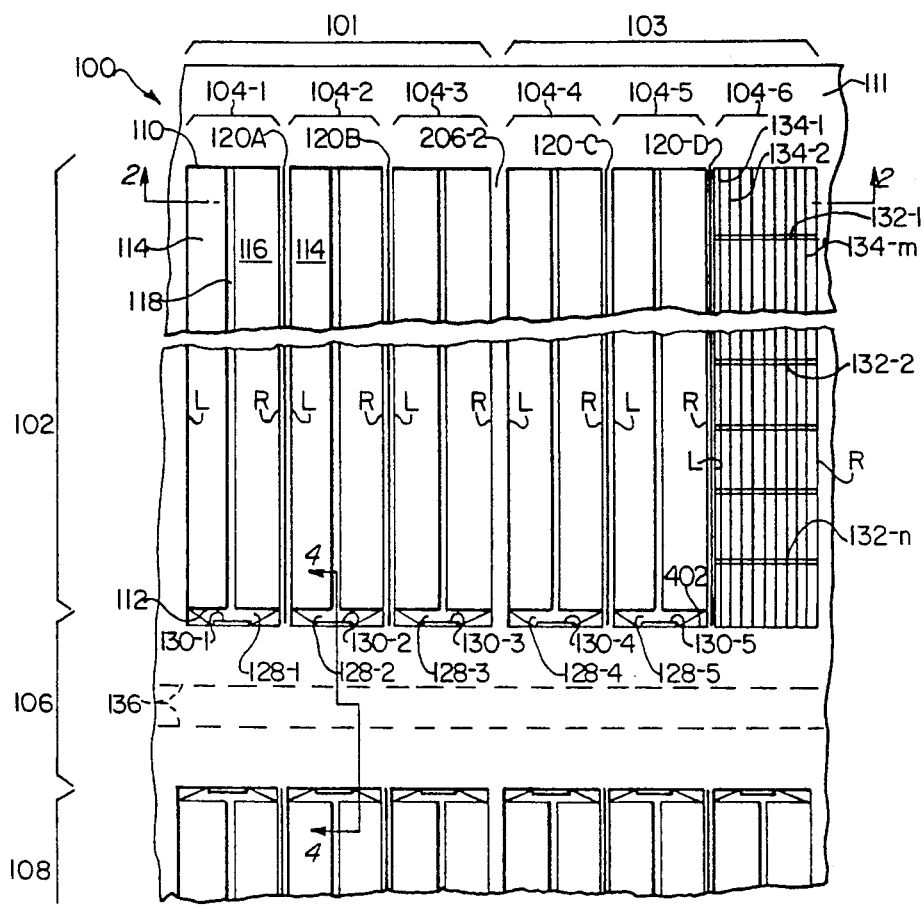
FIG. 1 is a top plan view of the plant production facility according to a first embodiment of the present invention.

In describing the embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
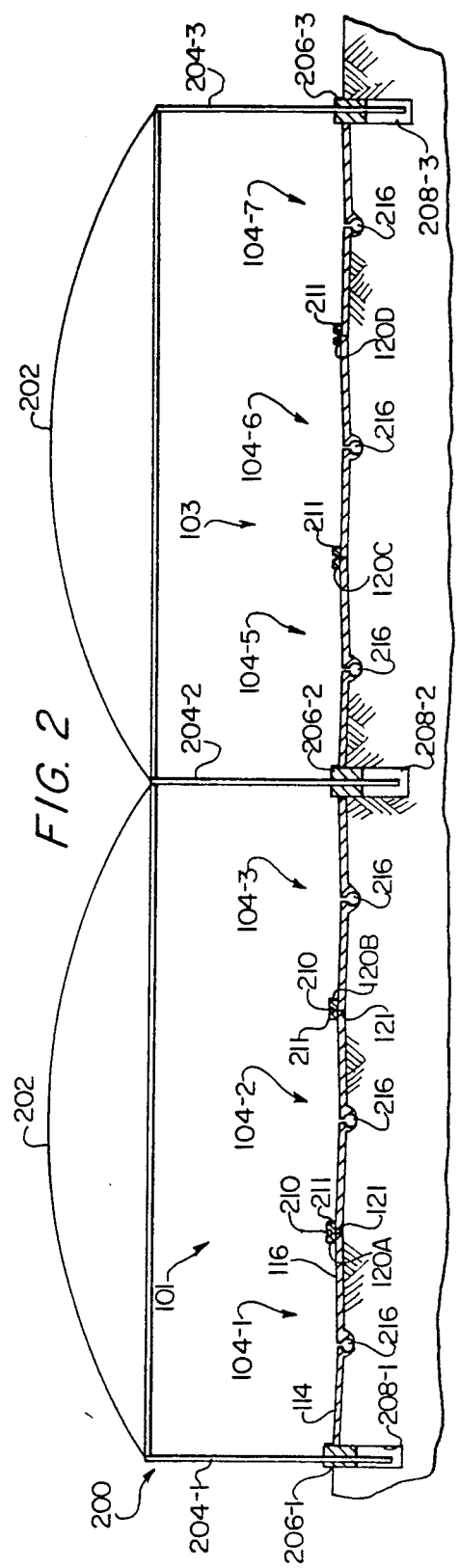
FIG. 2 is a cross-section of the first embodiment plant production facility taken along lines 2—2 of FIG. 1.

Referring to FIGS. 1 and 2, a first embodiment of the plant production system 100 according to the present invention is illustrated in top plan and transverse type elevation section views, respectively. A walk-way flume area 106 extends down the spine of the system between a first group 102 of branch channels or soaking beds and a second group 108 of branch channels or soaking beds as illustrated in FIG. 1. Soaking beds 104-1, 104-2, 104-3, 104-5 and 104-6 are provided in the first group 102 with the beds being substantially parallel structures extending between their outer ends 110 and inner ends 112 which are adjacent the central concrete walkway-flume area 106 that is approximately fifteen feet wide. The second group 108 of branch channels or soaking beds is also provided symmetrically relative to the first group 102 on the opposite side of the main walkway-flume area 106. The soaking beds of both groups are essentially identical and the overall structure of group 108 is essentially identical to that of group 102.

In the illustrated embodiment, the soaking beds are substantially rectangular in plan view, extending between the outer ends 110 which terminate at an outer and slab 111 and the inner ends 112 which terminate at the walkway-flume area 106. In the preferred embodiment, each soaking bed is a trough 81.5 inches wide and three hundred thirty feet long; it should be understood that the foregoing dimensions are not critical and different dimensions could be used if desired. Each bed includes a floor portion formed by first and second rectangular floor slabs 114, 116 separated by a longitudinal slot 118 at their inner edges leading to a slotted pipe 216 (FIG. 2) which is disposed horizontally beneath the planes of the first and second floor slabs 114, 116. As illustrated in FIG. 2, first slab 114 and second slab 116 slope downwardly 1" from their outer edges to their inner edges adjacent slot 118. Thus, the slabs 114 and 116 form a wide and flat "vee" having the longitudinal slot 118 extending downwardly from the vee's apex. Both slabs 114, 116 are substantially horizontal longitudinally, between their outer end 110 and their inner end 112.

Referring again to FIGS. 1 and 2, the soaking beds 104-11 104-2 and 104-3 comprise a first bank 101 of soaking beds or branch channels which is separated from an adjacent second bank 103 of beds or branch channels 104-4, 104-5 and 104-6 by a relatively thick concrete footing wall 206-2. The two banks 101 and 103 of beds in FIG. 2 also respectively have outer edges defined by concrete footing walls 206-1 and 206-3.

The first or left bank 101 of soaking beds includes lengthwise extending slotted curbs 120A and 120B for separating the center bed 104-2 from side beds 104-1 and 104-3; similarly, slotted curbs 120C and 120D are provided in the second bank 103 to separate the center bed 104-5 from side beds 104-4 and 104-6. The slotted curbs 120A, 120B, 120C and 120D are five inches high, nine inches wide and have lengthwise downwardly extending slots 210 in their upper surfaces that are one inch deep and four inches wide. Each slot 210 defines a track for vehicle wheels of a vehicle (not shown) movable along the length of each bank of beds for spraying or other operations associated with plant production in each bank. It should also be noted that each of the slotted curbs is fixedly anchored by wedge anchors or threaded bars 121 extending downwardly into the adjacent floor slabs 114, 116 of the two channels separated by each slotted curb.

Soaking beds 104-1 through 104-6 are each provided with left side walls L and right side walls R and with respective channeling areas 128-1 through 128-6 as shown in FIG. 1. Each channeling area 128 is disposed between the outlets of a drain pipe 216 and its associated slot 118 and a horizontally slidable steel or other metal gate 130 in the manner shown in FIG. 4. Gates 130-1 through 130-6 provide individualized control of the drainage of water or nutrient solution from the drain pipes 216 and their associated beds 104 or the reverse filling operation thereof. The purpose and operation of the gates 130-1 through 130-6 are described in greater detail below.

In FIG. 1, means for supporting floatable plant flats are illustrated in conjunction with the rightmost soaking bed 104-61 with the understanding that the same structures are normally provided for the other soaking beds. More specifically, a desired number of horizontal wire support beams in the form of pipes 132-1 through 132-n are disposed at substantially regular intervals perpendicular to the longer dimension of the soaking bed. One end of each pipe 132-1 through 132-n is received in an open topped slot (not shown) in slotted curb 120D and the opposite end is received in a similar aperture (not shown) in concrete footing wall 206-3; alternative means for supporting the pipes such as the saddle block described in connection with the second embodiment could also be used if desired. A plurality of relatively taut 9 gauge galvanized steel wires 134-1 through 134m are held in tension between eye-bolts or the like (not shown) in the concrete at the inner and outer ends of each bed. The wires extend parallel to the longer dimension of the soaking bed and are supported by the wire support pipes 132. Wires 134-1 etc. operate in the manner of wires 96 of U.S. Pat. Nos. 4,793,096 and 4,930,253 for supporting floatable plant flats.

Figure 3:
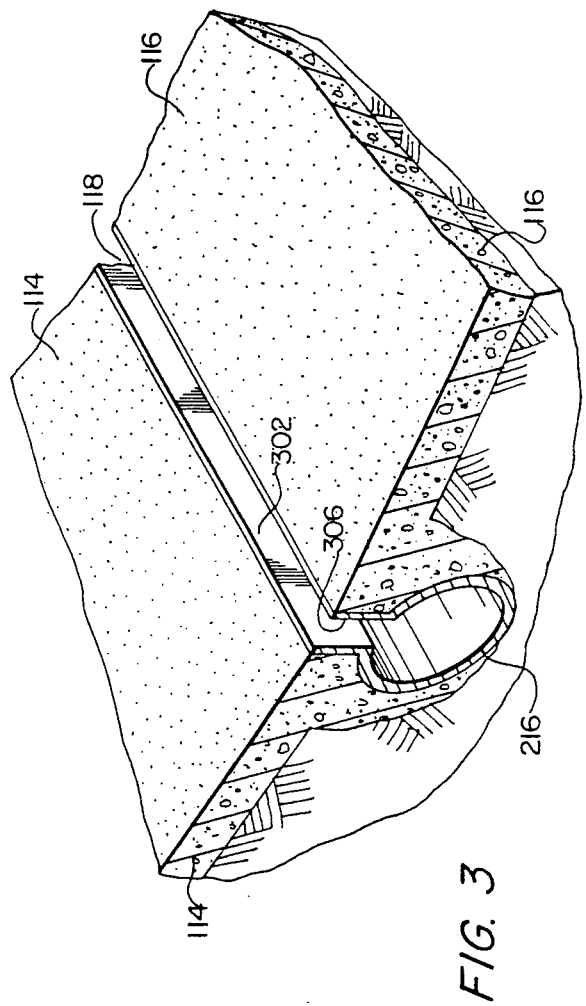
FIG. 3 is a perspective transverse cross-section of a portion of one of the branch channels or soaking beds of the first embodiment, illustrating the relationship of the floor slabs and the slotted drain pipe.

In the embodiment illustrated in FIGS. 11 2, and 3, slabs and 116 slope downward from their outer edges to their inner edges adjacent slot 118 as was noted previously and as shown in FIG. 3. The upper surface of each slab adjacent slot 118 is approximately one inch lower than its upper surface at each outer edge of each slab. Second slab 116 slopes downward in a mirrorlike image of slab 114 relative to slot 118. Both slabs are substantially horizontal in their longitudinal direction.

It is to be understood that each of the soaking beds 104-2 through 104-6 is constructed in a manner similar to soaking bed -1, and that reference numerals for many of the soaking beds have been omitted for the sake of clarity. Further, it is understood that soaking beds in second group 108 are structured in a substantially complementary mirror image fashion to the first group 102 of soaking beds.

Referring now more specifically to FIG. 2, the preferred plant production bed 100 is illustrated in partial cross-section as it would normally be typically deployed within a greenhouse 200. In a manner known to those skilled in the art, a greenhouse cover 202 is supported by a plurality of greenhouse support poles 204-1 through 204-3. The greenhouse support poles 204-1 through 204-3 are supported by respective reinforced concrete footings 206-1 through 206-3. Beneath the reinforced concrete footings may be provided slurry cutoff walls 208-1 and 208-3. In this manner, the plant production system 100 is protected from the elements in a manner known to those of skill in the art.

Referring now to FIG. 31 an eight inch diameter slotted CMP drain pipe 216 is illustrated in perspective in partial cross-section with slab 114. The slotted drain pipe 216 is connected to a slot defined by first and second side plates 302, 306, respectively. The bottom of each slot side plate merges into the circular surface of the drain pipe. Thus, in cross-section, the slotted drain pipe and side plates appear as an inverted keyhole with the wider drain pipe structure at the bottom and the slot extending upwardly therefrom. In a manner apparent to those of skill in the art, fluid will drain along the sloped upper surfaces of slabs 114, 116 to enter the upper end of slot 118. Similarly, fluid will drain from pipe 216 in the direction indicated by arrow 126.

As stated above, slabs 114, 116 are horizontal (not slanted) in their lengthwise direction indicated by arrow 126. Therefore, in operation, when nutrient solution fills the soaking bed to cover slabs 114, 116, the only solution other than that in pipe 216 and slot 118 which is required is that which occupies the space above the floor slabs 114 and 116 which has a maximum depth variation of only 1" between its deepest portion adjacent slot 118 and its shallowest portion adjacent its side edges. The foregoing relationship is in contrast to known systems, in which the entire length of the floor slab is canted so that its entire end adjacent the sump is lower than its outer end. Thus, in prior systems the depth of the solution at the lower end of the slab is substantially greater than at the outer end of the slab for the entire width of the slab.

Figure 4:
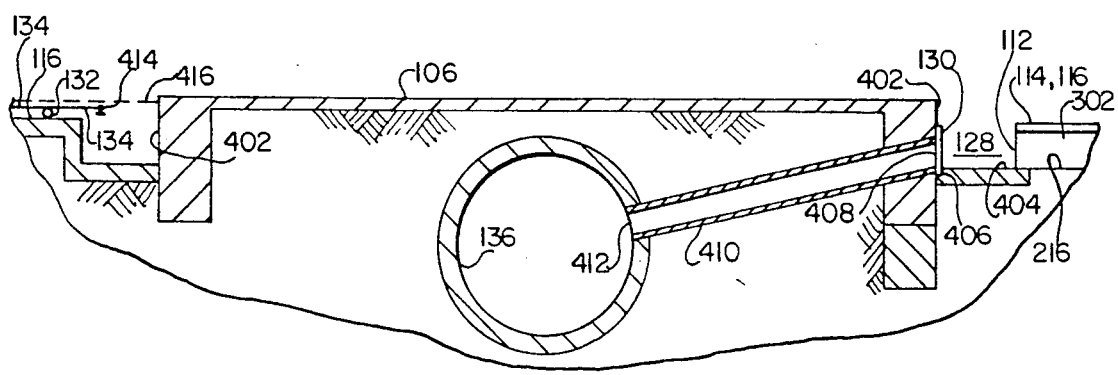
FIG. 4 is a cross-section taken along lines 4—4 of FIG. 1 illustrating the relationship of a main drainage flume and a typical associated channel or soaking bed of the first embodiment.

FIG. 4 illustrates the manner in which the slotted drain pipe 216 operates to drain each bed into the channeling area 128. The channeling area 128 is defined by the soaking bed's inner end 112, a bottom surface 404, and an outer surface 402 of the main walkway flume area 106. A sliding gate 130 is provided along outer surface 402, and when opened provides fluid communication with a sloped drainage channel in the form of an eight inch concrete pipe 410 leading from gate opening 408 to an opening 412 in flume pipe 136. A channel niche 406 is provided in bottom surface 404 to allow horizontal sliding movement of gate 130 between closed and opened position across the opening to the sloped drainage channel 410.

On the left side of FIG. 4, the wire support pipe 132 and a wire 134 are illustrated in a different arrangement than that of FIG. 1. An I-beam wire support 414 is provided transversely relative to the soaking bed to secure one end of a plurality of taut wires 134 in a substantially horizontal position with the other ends of the wires being secured in a similar manner. Wire support pipes 132 support eight taut galvanized steel wires 134 above the upper surfaces of slabs 114 and 116. The wire support pipes are 1 inch steel galvanized pipe provided every six feet along the length of the soaking bed. In operation, fluid is filled to a level 416 above that of wires 134, but below that of the level of the upper edge of outer surface 402 of the walkway flume area 106. Thus, floatable plant flats such as flats F shown in U.S. Pat. No. 4,930,253 are floatable above the level of wires 134. The water or nutrient solution contacts and wets the plant growth medium through the apertures in the bottom of the plant flat (not illustrated) for a predetermined time period. After this predetermined time period has expired, the nutrient solution may be drained by opening sliding gates 130. The water or nutrient solution drains down through sloped drainage channel 410 to the flume pipe 136 which is preferably formed of TCP. The nutrient solution then flows or is pumped to a storage tank. After the water or nutrient solution is drained, the plant flat (not illustrated) rests atop wires 134 for a predetermined time period following which the cycle may be repeated.

Figure 6:
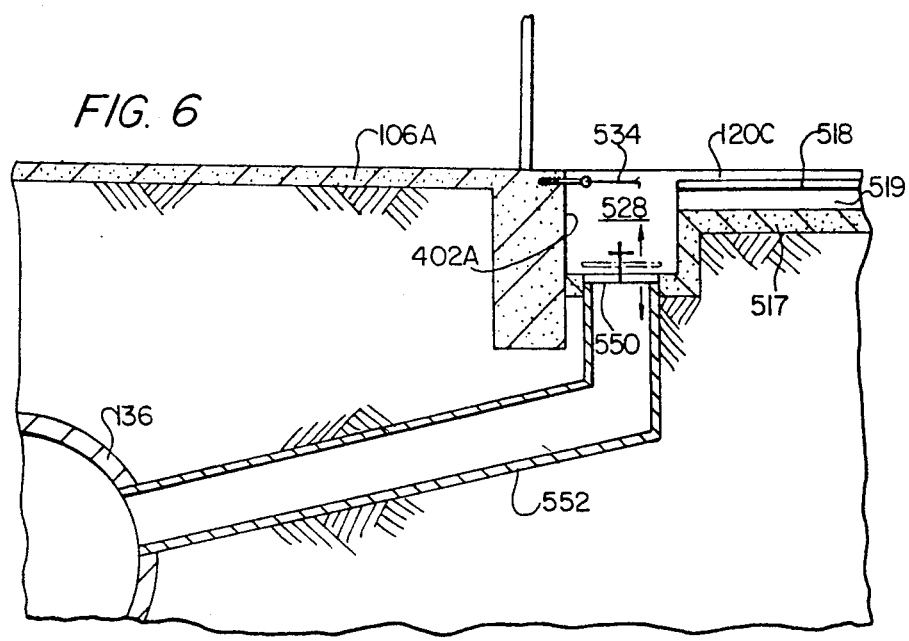
FIG. 6 is a sectional view taken along lines 6—6 of FIG. 4A.
Figure 5:
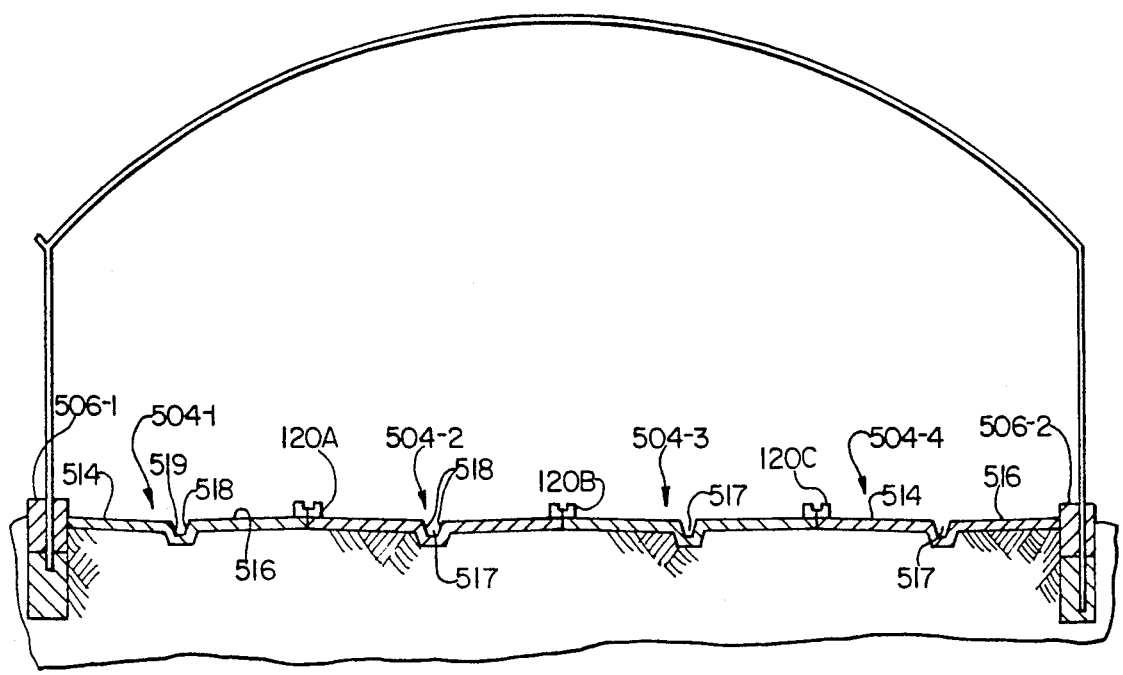
FIG. 5 is a traverse cross-section taken along lines 5—5 of FIG. 4A.
Figure 7:
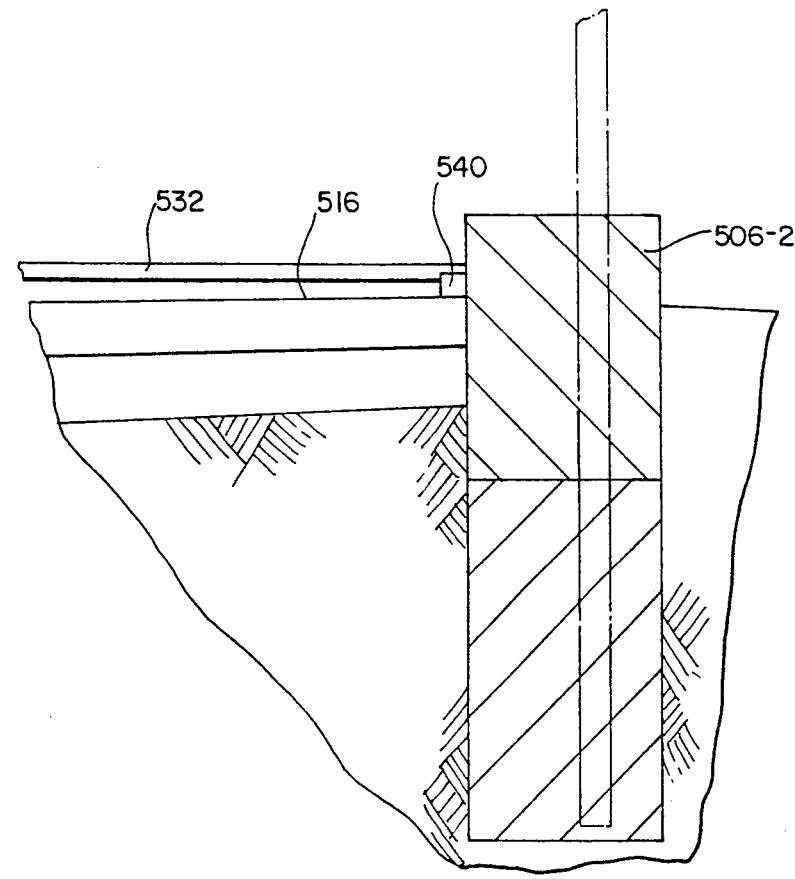
FIG. 7 is a sectional view taken along lines 7—7 of FIG. 4A.

A further embodiment of the invention is illustrated in FIGS. 5, 6 and 7. The embodiment of FIGS. 5, 6 and 7 differs from the previously-discussed embodiments in that it employs four branch channels or soaking beds as part of a common group instead of three branch channels or soaking beds in a group as in the first embodiment. Additionally, the embodiment of FIGS. 5, 6 and 7 does not employ a slotted drain pipe such as pipe 216. More specifically, a group of four branch channels comprising branch channels 504-11 504-2, 504-3 and 504-4 is provided between concrete footing walls 506-1 and 506-2 with three slotted curbs 120A, 120B and 120C being provided to separate the two interior branch channel 504-2 and 504-3 from each other and from the outer branch channels 504-1 and 504-4. The curbs 120A etc of this embodiment are identical to the curbs 120A etc. of the first embodiment. Corresponding branch channels 504-1A, 504-2A, 504-3A and 504-4A are provided in a second group on the opposite side of a central walkway flume area 106A having a center axis X and side edges 402A. Side edges 402' are spaced 15 feet apart and the upper surface of the walkway is 1.5 inches above the upper surface at each side edge with there being a continuous slope there between.

The bottom of each branch channel comprises rectangular floor slab portions 514 and 516 which slope downwardly from their side edges to their juncture with a flat-bottomed vee-shaped trough or swale 517 extending longitudinally along the axis of each branch channel. Each trough or swale 517 has downwardly and inwardly canted side walls 518 and horizontal bottom walls 519 and is 6" wide at the top and 4" wide at the bottom.

Figure 4A:
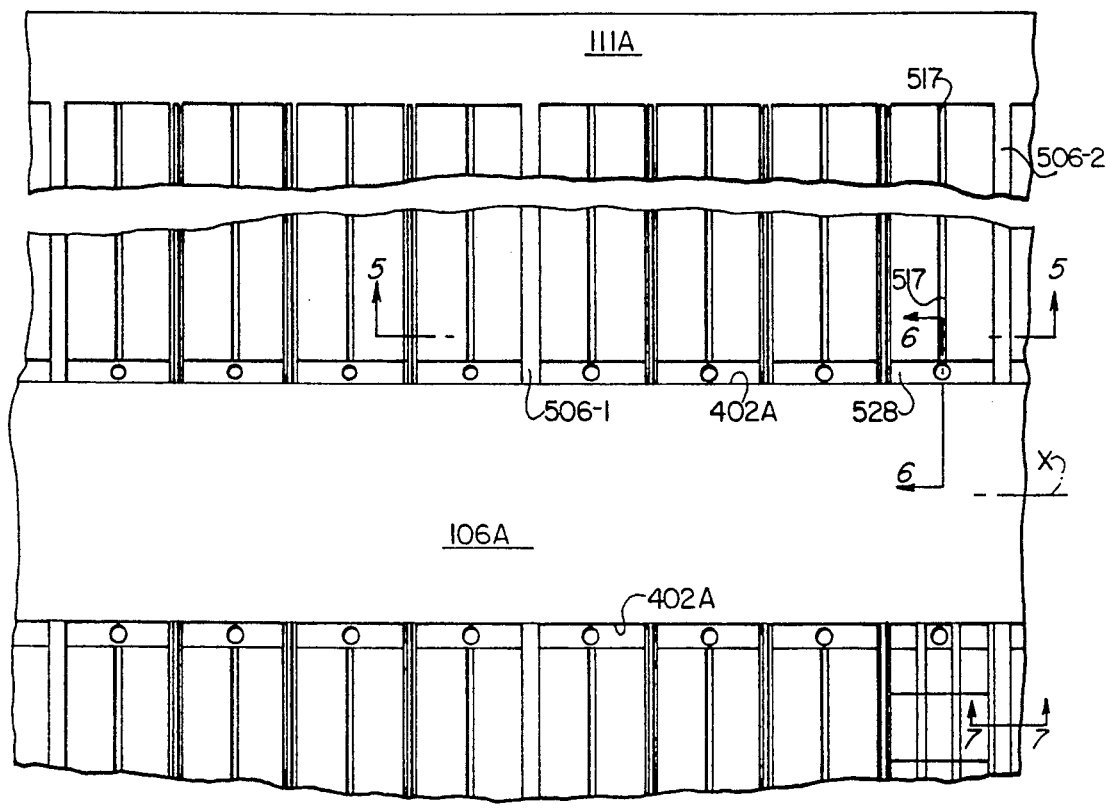
FIG. 4A is a plan view of a second embodiment which is the preferred embodiment.

Wires 534 also extend lengthwise above all of the branch channels; however, the wires are only illustrated for the sake of clarity in the lower right branch channel 504-4A of FIG. 4A in the manner of previously-discussed wires 134-1 etc. Beams in the form of pipes 532 extend transversely across each branch channel to support wires 534. The ends of pipes 532 are supported in matingly cylindrical recesses (not shown) in the upper surface of PVC saddle blocks 540 adhesively secured in position to the underlying slab and adjacent curb wall by epoxy glue.

The floor slab portions 514, 516 and the vee-shaped trough 517 are unitarily formed of a single concrete slab member having an outer end termination at an outer end slab 111A spaced 330 feet from side edge 402A. The slab portions 514 and 516 are oriented horizontally from their inner ends to their outer ends so as to reduce the volume of water required for filling each channel as compared to the amount that would be required if the floor channels were planar surfaces which sloped downwardly toward the channeling area 528.

A conventional alfalfa valve 550, such as such valves manufactured and sold by Waterman Industries, Inc. of Exeper, California under the designation "Type 3" is provided in the lower portion of the channeling area 528 for permitting drainage to a drain pipe 552 connected at its opposite end to the flume pipe 136 as best shown in FIG. 5. The alfalfa valve 550 serves to either preclude or permit the drainage or filling of its respective branch channel in a manner analogous to the operation of gate 130 of the first embodiment.

Modifications and variations of the above-described embodiments of the present invention are possible, as will be appreciated by those of skill in the art in light of the above teachings. For example, arrangements of soaking beds other than parallel rectangular soaking beds are envisioned such as radially extending soaking beds around a center drain may be useful in certain scenarios. Use of the invention is not restricted to floatable plant flats but is also usable with non-floatable flats. Also, different degrees of slope of the slabs and of the slotted drain pipes may be designed in accordance with principles known to those of skill in the art. Similarly, the invention may be applied to any problem in which fluid is desired to be recycled and preserved, and should not be limited to systems involving floatable plant flats. It is therefore to be understood that, within the scope of the appended claims and their equivalents, the invention may be practiced otherwise than as specifically described.

What is claimed is:

1. A plant production system soaking bed including:
   a center drainage/supply means for draining or supplying liquids;
   two groups of soaking beds arranged on opposite sides of the center drainage/supply means, each of the groups having a plurality of soaking beds in substantially parallel arrangement, each soaking bed including:
   1) two slabs extending horizontally in a longitudinal direction and sloped downward toward each other in a lateral direction to form a shallow "vee" shape having an imaginary apex; and
   2) a slotted drain pipe including (i) a pipe section and (ii) a vertical slot section, the vertical slot section extending from the imaginary apex of the "vee" downward to the pipe section, the pipe section extending horizontally in the longitudinal direction toward the center drainage structure;
   wire support beam-like structures disposed above the two slabs for supporting wires;
   wires extending across and above the wire support beam-like structures, for supporting plant flats; and
   a plurality of flow control means each respectively, disposed between the center drainage/supply structure and respective soaking beds, for controlling the supply to or drainage of liquids from the slotted drain pipe and the center drainage/supply structure.

2. A soaking bed for a plant production system, said soaking bed comprising:
   raise wall means defining first and second lengthwise extending side walls;
   floor slab mean positioned between said first and second side wall means and having an upper surface sloped in a lateral direction including lower edge means extending horizontally in a longitudinal direction;
   drain means extending horizontally in a longitudinal direction from and substantially below said lower edge means for effecting drainage of said soaking bed;
   the floor slab means comprising two slab components extending horizontally in a longitudinal direction and having upper surfaces sloped downwardly toward each other in a lateral direction to form a shallow "vee" shape having an apex; and
   the drain means including (i) a pipe section positioned below said apex and (ii) a vertical slot section, the vertical slot section extending generally from the apex of the "vee" to the pipe section and being oriented horizontally in the longitudinal direction.

3. The soaking bed of claim 2, further comprising:
   transversely oriented wire support pipes disposed above the slab means for supporting wires;
   parallel wires extending across and above the wire support pipes, or supporting plant flats.

4. The soaking bed of claim 2 wherein said side wall means includes at least one curb disposed on the upper surface of the floor slab means for separating each soaking bed from an adjacent soaking bed and for retaining liquid in the beds so that planting media in plant flats may be moistened by such liquid.

5. A plurality of soaking beds of the type recited in claim 2, and further including:
   a center liquid supply and drainage structure for draining or supplying liquids;
   said plurality of soaking beds being arranged in a mutually parallel arrangement in two groups of at least four beds each that are on opposite sides of the center liquid supply drainage structure.

6. The soaking bed of claim 2, wherein said drain means comprises swale means having a horizontal bottom surface and inwardly tapered side walls.

7. The soaking bed of claim 6 additionally including transversely oriented wire support beams transversely disposed over each soaking bed and a plurality of plant flat support wires extending lengthwise of each bed and supported by said wire support beams.

8. A soaking bed as recited in claim 7 wherein each of said wire support beams comprises a pipe and further including saddle block means at each end of each pipe and supported on said floor slab means for supporting each of said pipes.

9. A plant soaking bed comprising an elongated trough-like structure having an inner end and an outer end and including first and second side walls and a bottom floor portion, drain means extending lengthwise of said trough beneath said bottom floor portion, said bottom floor portion comprising slab means forming a first generally planar upper surface and a second generally planar upper surface, said first generally planar upper surface having an outer edge adjacent said first side wall and an inner edge in a lengthwise extending central area of the trough between said first and second side walls, said second planar upper surface having an outer edge adjacent said second side wall and an inner edge in said lengthwise extending central area of the trough, said first and second generally planar upper surfaces each respectively sloping downwardly from its respective outer edge to its respective inner edge and swale means provided between said inner edges of said first and second generally planar upper surfaces to permit the drainage of liquid from said trough-like structure.

10. The plant soaking bed of claim 9 wherein said swale means extends substantially the entire length of said trough-like structure and has an outer end and an inner end.

11. The plant soaking bed of claim 10 wherein said outer edges of said first and second generally planar upper surfaces are in a first horizontal plane and said inner edges of said first and second generally planar upper surfaces are in a second horizontal plane.

12. The plant soaking bed of claim 11 wherein said inner edges of said first and second generally planar surfaces are spaced from each other to define the top of said swale means.

13. A plant soaking bed as recited in claim 9 wherein said swale means has an inner end and an outer end and a horizontal bottom surface and additionally including a bed sump at the inner end of said swale and communicating with said swale, said bed sump having a bottom surface spaced lower than the horizontal bottom surface of said swale, a flume pipe extending transversely relative to said bed and inflow-outflow conduit means connecting said flume pipe and the bed sump for permitting the flow of liquid between said bed sump and said inflow-outflow conduit means.

14. A plant soaking bed as recited in claim 13 additionally including selectively operable valve means for either permitting or precluding liquid flow through said inflow-outflow conduit means.

15. A plant soaking bed as recited in claim 14 additionally including a plurality of spaced wire support beams extending transversely across said trough-like structure and a plurality of plant flat support wires extending lengthwise of said trough-like structure and resting on and supported by said wire support beams.

16. A soaking bed as recited in claim 15 wherein each of said wire support beams comprises a pipe and further including saddle block means at each end of each pipe and resting on said slab means for supporting each of said pipes.

17. A plant soaking bed as recited in claim 13 additionally including a plurality of spaced wire support beams extending transversely across said trough-like structure and a plurality of plant flat support wires extending lengthwise of said trough-like structure and resting on and supported by said wire support beams.

18. A soaking bed as recited in claim 17 wherein each of said wire support beams comprises a pipe and further including saddle block means at each end of each pipe and supported by and adhesively secured to said slab means for supporting each of said pipes.

19. A soaking bed as recited in claim 18 wherein said saddle block is formed of PVC.

* * * * *